US009701487B2

United States Patent
Unterseher

(10) Patent No.: US 9,701,487 B2
(45) Date of Patent: Jul. 11, 2017

(54) APPARATUS FOR TRANSPORTING CONTAINERS HAVING A MAGNETIC DRIVE

(71) Applicant: KRONES AG, Neutraubling (DE)

(72) Inventor: Josef Unterseher, Neutraubling (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 14/891,733

(22) PCT Filed: Jun. 3, 2014

(86) PCT No.: PCT/EP2014/061436
§ 371 (c)(1),
(2) Date: Nov. 17, 2015

(87) PCT Pub. No.: WO2014/195286
PCT Pub. Date: Dec. 11, 2014

(65) Prior Publication Data
US 2016/0114988 A1    Apr. 28, 2016

(30) Foreign Application Priority Data
Jun. 3, 2013    (DE) .................. 10 2013 105 687

(51) Int. Cl.
*B65G 54/02*    (2006.01)
*B65G 47/86*    (2006.01)

(52) U.S. Cl.
CPC ............ *B65G 54/02* (2013.01); *B65G 47/847* (2013.01)

(58) Field of Classification Search
CPC ............................. B65G 54/02; B65G 47/847
See application file for complete search history.

(56) References Cited

U.S. PATENT DOCUMENTS

| 6,459,061 | B1 | 10/2002 | Kugle et al. |
| 6,820,561 | B2 * | 11/2004 | Soldavini ............. B65G 17/345 |
| | | | 104/88.03 |
| 9,422,121 | B2 * | 8/2016 | Staunton ............... B65G 54/02 |

FOREIGN PATENT DOCUMENTS

| DE | 102007047000 | 4/2009 |
| DE | 102010018153 | 10/2011 |
| DE | 102012000680 | 8/2012 |

(Continued)

OTHER PUBLICATIONS

International Search Report; PCT/EP2014/061436; International Filing Date: Jun. 3, 2014; 2 Pgs.

*Primary Examiner* — Gene Crawford
*Assistant Examiner* — Keith R Campbell
(74) *Attorney, Agent, or Firm* — Schmeiser, Olsen & Watts, LLP

(57) ABSTRACT

An apparatus for transporting containers, having a circumferential transport path and at least one transport element which is arranged such as to be movable relative to this circumferential transport path, wherein this transport element can be driven at least partially by a magnetic force, wherein the transport path has a plurality of magnetic elements and at least one magnetizable element is also arranged on the transport element, and wherein a movement of the transport element relative to the transport path can be achieved by actuating the magnetic elements of the transport path. According to the invention, an electrically operated working element, which can be supplied inductive with electrical energy, is arranged on the transport element.

14 Claims, 1 Drawing Sheet

(56) References Cited

FOREIGN PATENT DOCUMENTS

| | | | |
|---|---|---|---|
| EP | 1167248 | A1 | 1/2002 |
| EP | 2511205 | A2 | 10/2012 |
| JP | H06 54403 | A | 2/1994 |
| JP | H0654403 | * | 2/1994 |
| JP | H09 283591 | A | 10/1997 |
| JP | 2001225943 | | 8/2001 |

* cited by examiner

APPARATUS FOR TRANSPORTING CONTAINERS HAVING A MAGNETIC DRIVE

CROSS-REFERENCE TO RELATED APPLICATIONS

This application claims priority to PCT Application No. PCT/EP2014/061436, having a filing date of Jun. 3, 2014, based on DE 10 2013 105 687.3, having a filing date of Jun. 3, 2013, the entire contents of which are hereby incorporated by reference.

FIELD OF TECHNOLOGY

The following relates to an apparatus and a method for transporting containers.

BACKGROUND

Such apparatuses and methods have been known for a long time from the prior art and serve, for example, to transport containers, during production, from a first treatment station, such as a blow moulding machine for example, to a further treatment station, such as a filling machine for example. Usually it involves starwheels or the like, on which a plurality of holding elements for holding the containers are arranged and which thus transport these containers along a predefined transport path. Also known, in addition, are chain conveyors which have on a chain said holding elements for holding the containers. These transport devices have the disadvantage that the spacing between the individual holding elements is fixed and cannot be varied. In addition, these apparatuses also do not permit a variable transport speed of individual holding elements.

Also known are transport devices in which the principle of a linear motor is used for moving the transport elements. Such apparatuses usually have a plurality of electromagnets arranged in a stationary manner, as well as transport elements which are movable relative thereto and which may also have magnetic means, such as permanent magnets for example. With such apparatuses, however, the problem arises that the transport elements are purely passive elements which cannot carry out any processing operations on the containers. However, it would often be desirable to carry out certain treatment operations also during transport of the individual containers, such as, for example, sterilizing operations, application operations, inspection operations or even just an opening and closing of the holding elements in order to allow a handover to further transport devices. However, this has hitherto proven to be difficult since the movement or drive for the movement also takes place by means of magnetic forces and a suitable energy transmission for such drives arranged on the transport elements is difficult to implement.

SUMMARY

An aspect relates to a transport device for transporting containers which is based on magnetic forces and which also offers a possibility of arranging electrically operated working elements on these transport elements.

An apparatus according to embodiments of the invention for transporting containers has a circumferential or even non-circumferential transport path and at least one transport element which is arranged such as to be movable relative to this transport path. This transport element can be driven at least partially by means of a magnetic force. Furthermore, the transport path has a plurality of magnetic elements and at least one magnetizable element is also arranged on the transport element. Furthermore, a movement of the transport element relative to the transport path can be achieved by actuating the magnetic elements (of the transport path and/or of the transport element). In one preferred embodiment, the transport path may be a circumferential transport path.

According to embodiments of the invention, an electrically operated working element (hereinafter also referred to as an electrically operated drive device), which can be supplied inductive with electrical energy, is arranged on the transport element. It is therefore proposed that one transport element and in particular a plurality of transport elements is provided, which can be moved relative to the transport path by magnetic forces, wherein said drive device or the working element, which can also be supplied preferably inductive with power, is provided on at least one of these transport elements.

For example, this working element or this drive device may be an actuator which actuates for example the holding element in order thus to effect a holding or release of the container. For example, the holding elements may be configured both as active and as passive holding elements, that is to say a release or holding of the container may also take place actively, for example by means of magnetic forces. An electric drive device will be understood to mean a drive device selected from a group of working elements or drive devices that includes electric motors, in particular rotation or linear motors, magnetic elements and the like. Preferably, the energy for generating the movement of the transport element relative to the transport path is transmitted in a contactless manner. The energy for the drive device is also advantageously transmitted in a contactless manner.

It is advantageous that at least one transport element is designed in such a way that it can compensate, as it travels relative to the transport path, for a difference in speed of transport between a container treatment device upstream of the transport apparatus and a treatment device downstream of the transport apparatus.

In a further advantageous embodiment, the apparatus has a plurality of transport elements which are movable relative to the transport path, and the movements thereof relative to the transport path are controllable independently of one another. In this way, for example, different spacings can be set in a highly individual manner.

In a further advantageous embodiment, the transport path has at least one buffer section into which at least one of the at least one transport element can run in order to vary the density of the transport elements on the transport path.

In a further advantageous embodiment, the transport path is configured as a magnetic suspension track of a magnetic suspension railway. However, it would also be conceivable that the individual transport elements slide along the transport path via rollers.

In a further advantageous embodiment, the at least one transport element is mounted on the transport path in an entirely magnetic or partially magnetic and partially mechanical manner.

In a further advantageous embodiment, the transport path may have any geometric shape. For instance, the transport path may have a substantially rectilinear profile in the region in which the transport elements each carry containers, but may optionally also have curved profiles.

In a further advantageous embodiment, the apparatus has a rotating device which rotates the containers through a predefined angle of rotation relative to their longitudinal axis. In this case, the drive device may be a rotation drive which brings about said rotation. In a further advantageous embodiment, at least one treatment device which serves for treating the containers transported by the transport elements is arranged along the transport path. It is possible that several such treatment devices are arranged for example in series or parallel to one another. For instance, it would be possible that a plurality of identical treatment elements, that is to say treatment elements which each carry out the same treatment step, are arranged parallel or next to one another. However, it would also be possible that a plurality of treatment elements which carry out different treatment steps are arranged on the transport path.

In a further advantageous embodiment, the transport elements are mounted on the transport path by means of roller elements and in particular rollers.

In a further advantageous embodiment, the transport elements each have magnetic elements which serve for achieving the movement, wherein these magnetic elements are preferably permanent magnets. Advantageously, further magnetic elements are provided which serve for supplying energy to the drive device. Advantageously, the magnetic elements arranged on the transport element, which serve for moving the transport element as a whole, and the magnetic elements (arranged on the transport element) which serve for supplying the drive device are offset relative to one another and in particular are offset relative to one another in a transport direction of the transport elements. Preferably, those magnetic elements of the transport element which serve for supplying the drive device are arranged upstream of said permanent magnets (which serve for generating the movement) in a movement direction of the transport element.

In a further advantageous embodiment, the transport elements have energy storage means for supplying the drive devices with electrical energy. It is possible that these energy storage means are also charged by the inductive measures described above. In addition, voltage smoothing means may also be provided, which smooth a supplied voltage for outputting to the drive device. Rectifying devices for rectifying the inductively supplied voltage may also be provided.

In a further advantageous embodiment, at least one (electric) coil element is provided on the transport device, which coil element serves for providing the electrical energy to the drive device. By means of this coil, currents can be generated or induced by the magnets arranged on the transport path, which currents are in turn supplied to the drive device. This will be explained in more detail with reference to the figures. This coil element may be wound around a core. Preferably, the ends of this core point towards the transport path or the electromagnets thereof. This coil element is preferably electrically conductively connected to the drive device.

In a further advantageous embodiment, at least some of the magnetic elements of the transport path are electromagnets. By suitable actuation of these electromagnets, on the one hand a movement of the transport elements relative to the transport path can be achieved, but on the other hand it is also possible to supply the drive device inductive with electrical energy by means of suitable actuation.

In a further advantageous embodiment, therefore, said magnetic elements of the transport path also serve for the electrical supply to the drive device. Advantageously, at least one magnetic element is suitable, by virtue of appropriate actuation, both for achieving the movement of the transport element in its entirety and also for supplying the drive device. However, it would also be possible, for example, that two parallel paths of magnets are arranged on the transport path, wherein one of these paths serves for generating the movement and the other serves for supplying the drive device.

In a further advantageous embodiment, the apparatus has a control device which supplies the magnetic elements with a movement-generating voltage, by which a movement of the transport elements is brought about, and/or which supplies the magnetic elements with an activator voltage which supplies the drive device with electrical energy. Advantageously, both voltages are alternating voltages. In this case, it is possible to control on the one hand a speed of the transport element relative to the transport path, but also an activation or actuation of the drive device.

In a further advantageous embodiment, the activator voltage has a higher frequency than the movement-generating voltage. In the case of the movement-generating voltage, for example, it is possible that the individual magnets are magnetized in a predefined order and thus the transport element is drawn forwards by the magnetic force. The voltages used to operate the at least one working element on the transport element are of higher frequency in comparison thereto, in order in this way not to interfere with the movement of the transport element.

In a further advantageous embodiment, the transport path has a plurality of coil elements for supplying the magnetic elements. It is possible in each case that two electromagnet ends arranged next to one another are supplied by one coil, so that, depending on the direction of current within the coil, one of the two regions becomes the magnetic plus pole and the other becomes the magnetic minus pole.

Embodiments of the present invention are also directed to a method for transporting containers, wherein the containers are moved by a plurality of transport elements along a transport path which is preferably but not necessarily circumferential, and wherein the transport path has a plurality of magnetic elements and the movement of the transport elements along the transport path is generated by a magnetic force. At least one magnetizable element is also arranged on the transport elements, which magnetizable element serves for the movement of the transport element along the transport path.

According to embodiments of the invention, a drive device which can be operated by electrical energy is arranged on at least one transport element, and this drive device is also supplied inductive with electrical energy.

The containers are preferably plastic containers and in particular plastic bottles or plastic preforms. Advantageously, the containers are transported from a first treatment device, which treats the containers in a first predefined manner, to a second treatment device, which treats the containers in a second predefined manner.

Advantageously, the magnetic elements of the transport path are supplied with a movement-generating voltage, by which the movement of the transport elements is brought about, and with an activator voltage which supplies the drive device with electrical energy. Preferably, the supplying with the respective voltages takes place simultaneously at least at times. However, it would also be possible that the supply to the drive devices takes place not continuously but rather, for example, only at certain path sections. For example, it would be possible that energy storage means, such as batteries or capacitors, are provided on each of the transport elements and these energy storage means are charged, for example, in those regions in which no container is located on the transport elements.

In a further advantageous method, a first magnetic field, which brings about the movement of the transport elements, is transmitted in a first predefined region in relation to the transport element and a second magnetic field, which supplies the drive device with electrical energy, is transmitted in a second region in relation to the transport element. The two regions are advantageously offset relative to one another. Advantageously, said second region is located upstream of the first region in a transport direction of the transport element relative to the transport path.

However, it would also be possible that the two magnetic fields are transmitted in the same regions, and in particular by the same magnetic elements. For instance, on the one hand the movement of the respective transport element could be achieved by the magnetic elements, but at the same time the voltage applied to these magnetic elements could be modulated with a further voltage which serves for supplying the electric drive device.

Advantageously, the transport elements are moved relative to the transport path by means of roller bodies.

In a further advantageous method, the transport elements are moved in one plane and particularly preferably in a horizontal plane.

In a further advantageous embodiment, the transport elements are moved at least in some sections along a transport path of finite curvature. Advantageously, the transport elements are also moved along a transport path with different directions of curvature, that is to say with radii of curvature having different signs.

Advantageously, the movement of at least one transport element is controlled independently of the movement of at least a second transport element. This means that, for example, a relative speed of one certain transport element in relation to the relative speed of a second transport element can change during the transporting of the transport elements relative to the transport path.

Advantageously, a spacing between two successive transport elements changes at least temporarily during transport along the transport path.

BRIEF DESCRIPTION

Some of the embodiments will be described in detail, with reference to the following figures, wherein like designations denote like members, wherein.

DETAILED DESCRIPTION

Figure 1:
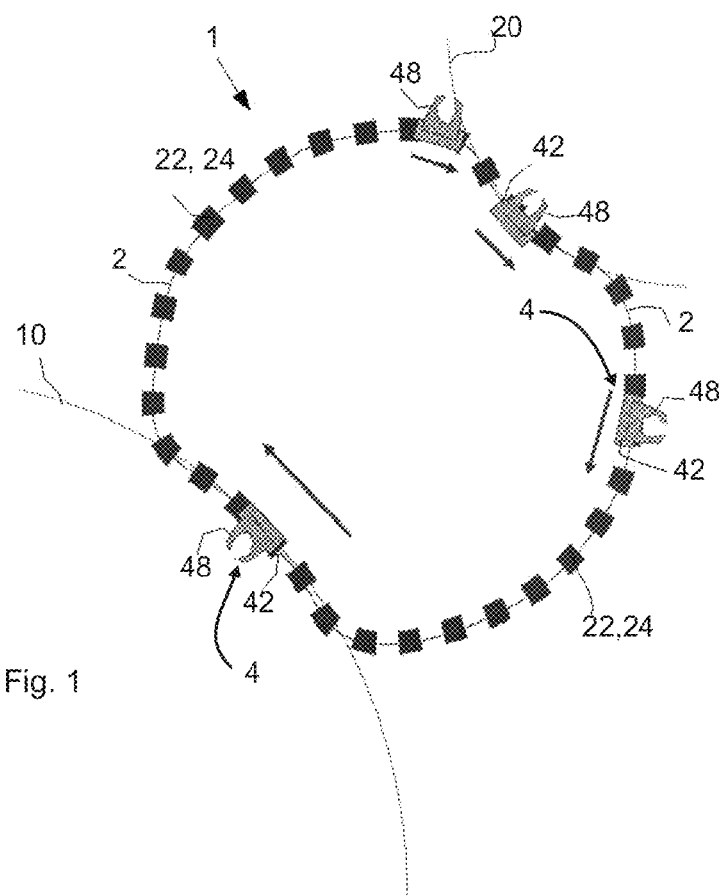
FIG. 1 shows an arrangement for treating containers, having an apparatus.

FIG. 1 shows a system for treating containers. This arrangement has a first treatment machine 10, which treats the containers in a predefined manner. The arrangement additionally has a second treatment machine 20, which is arranged downstream of the first treatment machine in a transport direction of the containers and which treats the containers in a second predefined manner. For example, the first apparatus may be an oven which heats the plastic preforms, and the second treatment apparatus may be a transforming device which transforms the (heated) plastic preforms into plastic containers. However, other arrangements and/or combinations of machines would also be conceivable, for example a transforming device and a filling device arranged downstream thereof, a filling device and a capping device arranged downstream thereof, and the like.

Located between these two apparatuses 10, 20 is an apparatus 1 according to embodiments of the invention for transporting plastic containers. This apparatus 1 has a transport path 2 which is arranged in a stationary manner and relative to which a plurality of transport elements 4 move. However, only three of these transport elements are shown in detail here. The individual transport elements can thus move along the transport path 2, which is a closed transport path here. This transport path has a carrier, relative to which the individual transport elements can move.

However, embodiments of the invention permit independent control of the movements of the individual transport elements. For example, the spacings between two adjacent transport elements can be increased and reduced largely at will. The transport elements can also be moved more quickly or more slowly independently of one another.

The procedure according to embodiments of the invention also offers the advantage that the transport path can also be adapted to the configurations of the downstream apparatuses, in this case in particular to a circular transport path which results in the region of the first treatment apparatus 10 and the second treatment apparatus 20. The individual transport elements have here a carrier 46 and a holding element 48 arranged thereon for holding the plastic containers (not shown). During operation, it would be possible, for example, that the plastic preforms are accepted by the first apparatus 10 for treating plastic containers and then are brought relatively quickly into the region of the second apparatus, where they are again transported at a speed adapted to the second treatment apparatus 20.

Figure 2:
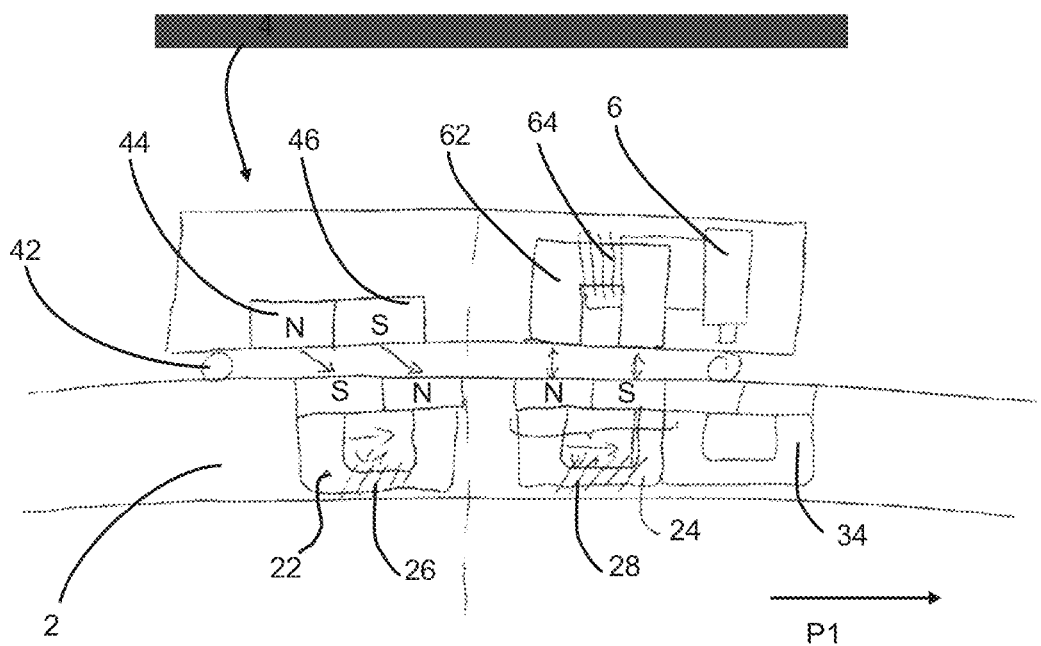
FIG. 2 shows a detail view of an apparatus.

FIG. 2 shows a detailed view of an apparatus 1 according to embodiments of the invention. The transport path 2 is again shown. Here, this transport path 2 has a plurality of magnetic elements 22, 24. These are each connected in series and each have a magnetic core, around which a coil 26, 28 is wound. By appropriate actuation of this coil, the magnetic elements 22, 24 can be actuated at will.

A transport element 4, which is denoted 4 in its entirety, can move relative to this (stationary) transport path 2 in a movable manner. For this purpose, rollers 42 are provided here, by means of which the transport element can roll relative to the transport path 2.

However, it would also be possible that the transport element 4 is designed in the manner of a magnetic suspension railway. By suitable actuation of the successive magnetic elements 22, 24, the transport element 4 can be moved, for example, in the direction from left to right in the figure (arrow P1). For this purpose, magnetizable elements, and here in particular permanent magnets 44, 46, are also arranged on the transport element 4. These magnetizable elements are preferably provided with alternating polarities. In the situation shown in FIG. 2, the transport element is still being pulled to the right by the suitable magnetization of the magnetic elements 22, 24.

A drive device 6 is additionally arranged on the transport element 4. Said drive device is shown only schematically here, and it may be, in particular, any type of electric drive, in particular electric motors, electromagnets and the like.

Preferably, this drive device can carry out a working operation with the container to be transported.

In addition, the transport element 2 has a further coil arrangement 64 and also an iron core 62. By means of this arrangement, current and/or voltage can be supplied to the drive device 6 via an alternating magnetic field. Preferably, the drive device 6 can thus be supplied with voltage in a contactless manner. For this purpose, there is applied to the coil 28 of the magnetic element 24 a (high-frequency)

alternating voltage which generates a corresponding alternating magnetic field. Via this alternating magnetic field, the drive device 6 can be supplied with current.

Reference 50 denotes a control device which actuates the individual magnetic elements. It is pointed out here that the individual magnetic elements 22 and 24 can serve, depending on their position, both for the movement of the transport element 4 and for supplying current to the drive device 6. Therefore if, for example, the transport element 4 has moved further by one position starting from the situation shown in FIG. 2, the magnetic element 24 brings about the movement or onward pulling of the transport element and the further magnetic element 34, neighbouring the magnetic element 24 to the right, supplies the drive device 6 with voltage. This means that, during operation, the application of the alternating electric field to the magnetic elements 22, 24 for supplying the drive device also migrates, namely preferably at the same speed at which the transport element 4 also moves relative to the transport path 2.

Preferably, therefore, the distance between a magnetic element which is presently responsible for supplying energy to the drive element 6 and a magnetic element which is presently responsible for the movement of the transport element 4 is constant.

In other words, the control device is configured in such a way that the respective forwarding of the alternating field or alternating current for the magnetic elements proceeds at the same speed as the magnetizing wave, which magnetizing wave is in turn responsible for moving the transport element 4.

As mentioned, however, at a given point in time, the same magnetic element can also be used both for generating the transport element in its entirety and for the electrical supply to the drive device 6.

However, it would also be possible that magnetic elements are provided exclusively for the movement of the transport element 4, and magnetic elements arranged for example in parallel therewith are responsible exclusively for supplying current to the drive device 6. In this case, it would likewise be conceivable that the energization or actuation of these two magnetic elements proceeds in each case at the same speed, in particular at the speed of the transport elements relative to the transport path 2.

Preferably, therefore, the coil device 64 can form with the coil devices of the transport path a pairing which is constructed on the same principle as a transformer. Besides the actual magnetic field which serves for the movement of the transport element, the abovementioned second magnetic field can move with the two poles. This second magnetic field changes direction with a higher frequency, and thus generates an alternating magnetic field relative to the coil device 64.

Preferably, this second magnetic field can be switched on and off at will, which is also due to the design of the arrangement as a linear motor. As mentioned above, this induced voltage can be used to switch, for example, an electromagnet or electrocylinder and thus, in any position and for any length of time, can carry out an action such as, for example, a clamping, rotation or displacement.

Preferably, this switching process or this supply to the drive device represents in the control device a second movement device which is arranged at a fixed distance from the first drive that is responsible for the movement of the transport element. In this case, control software may be provided for changing with a higher frequency the magnetic field for supplying the drive device.

In addition, it would also be possible that the apparatus has trigger devices which switch on or off a supply to the drive device at predefined positions of the transport element relative to the transport path. For example, there could be arranged on the transport element and/or on the transport path a light barrier device which detects a position of the transport element 4. Preferably, the drive device can be controlled depending on a position, thus detected, of the transport element 4 relative to the transport path.

However, it would also be conceivable that a position of the transport element relative to the transport path is determined by the transport path and/or on the basis of currents induced here.

For example, a gripping device arranged on the transport element 4 for gripping the containers could be actuated in such a way that it grips a container at a predefined position of the container and/or releases the grip on the container at another predefined position of the transport element relative to the transport path.

In this case, it would be possible that commands, for example control commands for the drive device, are also transmitted to the drive device (for instance through suitable modulation of the signal) along with the supply energy for the electrical supply of the drive device.

Furthermore, it would also be possible that several drive devices are arranged on at least one transport element (4). In this case, it would be possible that these drive elements are controlled and/or supplied with energy independently of one another. This energy may in each case be transmitted in the manner mentioned above, that is to say inductively.

Furthermore, it would also be possible that a processor device or a control device for controlling the drive device is arranged on the transport element. Furthermore, it is also possible that the apparatus has a detection device for detecting a position of a drive element of the drive device.

The applicant reserves the right to claim as essential to the invention all the features disclosed in the application documents in so far as they are novel individually or in combination with respect to the prior art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE SIGNS

1 apparatus according to the invention
2 transport path
4 transport elements
6 drive device
10 first treatment machine
20 second treatment machine
22, 24, 34 plurality of magnetic elements
26, 28 coil
42 carrier
44, 46 permanent magnets
48 holding element
50 control device
62 iron core
64 coil arrangement

The invention claimed is:

1. An Apparatus for transporting containers, comprising:
   a transport path; and
   at least one transport element which is arranged such as to be movable relative to this transport path, wherein this transport element can be driven at least partially by a magnetic force, wherein the transport path has a plurality of magnetic elements; and
   at least one magnetizable element is also arranged on the transport element, and wherein a movement of the transport element relative to the transport path can be achieved by actuating the magnetic elements of the transport path, wherein an electrically operated working element, which can be supplied inductive with electrical energy, is arranged on the transport element and the magnetic elements of the transport path also serve for the electrical supply to the working, element.

2. The apparatus according to claim 1, wherein at least one coil element is provided on the transport element, which coil element serves for providing the electrical energy to the working element.

3. The apparatus according to claim 1, wherein at least some of the magnetic elements of the transport path are electromagnets.

4. The apparatus according to claim 1, wherein the apparatus has a control device which supplies the magnetic elements with a movement-generating voltage, by which a movement of the transport elements is brought about, and which supplies the magnetic elements with an activator voltage which supplies the working element with electrical energy.

5. The apparatus according to claim 4, wherein the activator voltage has a higher frequency than the movement-generating voltage.

6. The apparatus according to claim 4, wherein the transport path has a plurality of coil elements for supplying the magnetic elements.

7. A method for transporting containers, comprising:
   moving the containers by a plurality of transport elements along a transport path, wherein the transport path has a plurality of magnetic elements, and wherein the step of moving further comprises movement of the transport elements along the transport path being generated by a magnetic force, wherein at least one magnetizable element is also arranged on the transport elements, which magnetizable element serves for the movement of the transport elements along the transport path, wherein at least one working element which can be operated by electrical energy is arranged on at least one transport element, and this at least one working element is also supplied inductively with electrical energy and the magnetic elements are supplied with a movement-generating voltage by which the movement of the transport elements is brought about, and with an activator voltage which supplies the drive device with electrical energy.

8. The method according to claim 7, wherein the step of moving further comprises a first magnetic field, which brings about the movement of the transport elements, is transmitted in a first predefined region in relation to the transport element and a second magnetic field, which supplies the drive device with electrical energy, is transmitted in a second region in relation to the transport element, and the two regions are offset relative to one another.

9. An apparatus for transporting containers, comprising:
   a transport path; and
   at least one transport element which is arranged such as to be movable relative to this transport path, wherein this transport element can be driven at least partially by a magnetic force, wherein the transport path has a plurality of magnetic elements; and
   at least one magnetizable element is also arranged on the transport element, and wherein a movement of the transport element relative to the transport path can be achieved by actuating the magnetic elements of the transport path, wherein an electrically operated working element, which can be supplied inductive with electrical energy, is arranged on the transport element and the apparatus has a control device which supplies the magnetic elements with a movement-generating voltage, by which a movement of the transport elements is brought about and which supplies the magnetic elements with an activator voltage which supplies the working element with electrical energy, wherein the activator voltage has a higher frequency than the movement-generating voltage.

10. An apparatus according to claim 1, wherein the movements of the individual transport elements are controlled independent so that the spacings between two adjacent transport elements can be increased and reduced.

11. An apparatus according to claim 1, wherein the transported containers are plastic bottles or plastic preforms and wherein holding elements which are configured as active holding elements provided for holding the plastic containers.

12. An apparatus according to claim 1, wherein the apparatus has a rotating device which rotates the container through a predefined angle of rotation relative to their longitudinal axis.

13. An apparatus according to claim 1, wherein batteries or capacitors are provided on each of the transport elements.

14. An apparatus according to claim 1, wherein the transport path can be adapted to the configurations of the downstream apparatuses.

* * * * *